United States Patent
Lee et al.

(10) Patent No.: US 10,963,042 B2
(45) Date of Patent: Mar. 30, 2021

(54) SPONTANEOUS BLINKING CALIBRATION METHOD AND BLINKING CONTROL METHOD

(71) Applicant: Qisda Corporation, Taoyuan (TW)

(72) Inventors: Tsung-Hung Lee, Taoyuan County (TW); Wei-Huan Lee, Taipei (TW)

(73) Assignee: Qisda Corporation, Taoyuan (TW)

( * ) Notice: Subject to any disclaimer, the term of this patent is extended or adjusted under 35 U.S.C. 154(b) by 39 days.

(21) Appl. No.: 16/562,357

(22) Filed: Sep. 5, 2019

(65) Prior Publication Data

US 2020/0103960 A1 Apr. 2, 2020

(30) Foreign Application Priority Data

Sep. 29, 2018 (CA) .......................... 2018 1 1146897

(51) Int. Cl.
*G06F 3/01* (2006.01)
*G06K 9/00* (2006.01)
(52) U.S. Cl.
CPC ............ *G06F 3/011* (2013.01); *G06K 9/0061* (2013.01); *G06K 9/00335* (2013.01)
(58) Field of Classification Search
None
See application file for complete search history.

(56) References Cited

U.S. PATENT DOCUMENTS

| 2011/0216181 | A1* | 9/2011 | Yoda | A61B 5/1103 348/78 |
| 2011/0313259 | A1* | 12/2011 | Hatakeyama | B60K 28/06 600/300 |
| 2016/0304099 | A1* | 10/2016 | Hatakeyama | A61B 5/0496 |
| 2019/0059790 | A1* | 2/2019 | Yoshii | A61B 5/1103 |

\* cited by examiner

*Primary Examiner* — Krishna P Neupane

(57) ABSTRACT

The blinking control method comprises the following steps. First, detect a current blinking signal, wherein the current blinking signal occurs at a current blinking time point. Afterwards, obtain a predicted spontaneous blinking time slot according to the current blinking time point, a minimum spontaneous blinking calibration time interval, and a maximum spontaneous blinking calibration time interval. Afterwards, detect a next blinking signal. Afterwards, determine if the next blinking signal occurs within the predicted spontaneous blinking time slot. Determine if the next blinking signal belongs to a spontaneous blinking when the next blinking signal occurs within the predicted spontaneous blinking time slot. Determine if the next blinking signal belongs to a controlled blinking when the next blinking signal occurs outside the predicted spontaneous blinking time slot.

11 Claims, 6 Drawing Sheets of China application Serial No. 201811146897.3, filed Sep. 29, 2018, the subject matter of which is incorporated herein by reference.

SPONTANEOUS BLINKING CALIBRATION METHOD AND BLINKING CONTROL METHOD

This application claims the benefit of People's Republic of China application Serial No. 201811146897.3, filed Sep. 29, 2018, the subject matter of which is incorporated herein by reference.

BACKGROUND OF THE INVENTION

Field of the Invention

The invention relates in general to a blinking calibration method and blinking control method, and more particularly to a spontaneous blinking calibration method and blinking control method.

Description of the Related Art

In general, conventional virtual reality wearable devices send out a control command by using controlled blinking. Based on physiological phenomenon, the user's (wearer's) eyes inevitably occur spontaneous blinking. Spontaneous blinking is a physiological natural response, but isn't a user intended controlled blinking. However, the wearable device may misdetermine the user's spontaneous blinking as a controlled blinking, and execute a non-user expected function.

SUMMARY OF THE INVENTION

The invention is directed to a spontaneous blinking calibration method and blinking control method, capable of resolving the abovementioned conventional problems.

According to one embodiment of the present invention, a spontaneous blinking calibration method is provided. The spontaneous blinking calibration method comprises the following steps: obtaining a plurality of spontaneous blinking calibration signal; obtaining a spontaneous blinking calibration time interval between each two adjacent ones of the plurality of spontaneous blinking calibration signal; obtaining a spontaneous blinking interval average value of the plurality of spontaneous blinking calibration time intervals; obtaining a standard deviation of the plurality of spontaneous blinking calibration time intervals; obtaining a minimum spontaneous blinking calibration time interval according to the spontaneous blinking interval average value and the standard deviation; obtaining a maximum spontaneous blinking calibration time interval according to the spontaneous blinking interval average value and the standard deviation; and using the minimum spontaneous blinking calibration time interval and the maximum spontaneous blinking calibration time interval in a blinking control method to filter the occurrence of a spontaneous blinking.

According to another embodiment of the present invention, a blinking control method is provided. The blinking control method comprises the following steps: a current blinking signal is detected, wherein the current blinking signal occurs at a current blinking time point; a predicted spontaneous blinking time slot is obtained according to the current blinking time point, a minimum spontaneous blinking calibration time interval, and a maximum spontaneous blinking calibration time interval; detecting a next blinking signal; determining if the next blinking signal occurs within the predicted spontaneous blinking time slot; determining if the next blinking signal belongs to a spontaneous blinking when the next blinking signal occurs within the predicted spontaneous blinking time slot; and determining if the next blinking signal belongs to a controlled blinking when the next blinking signal occurs outside the predicted spontaneous blinking time slot.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
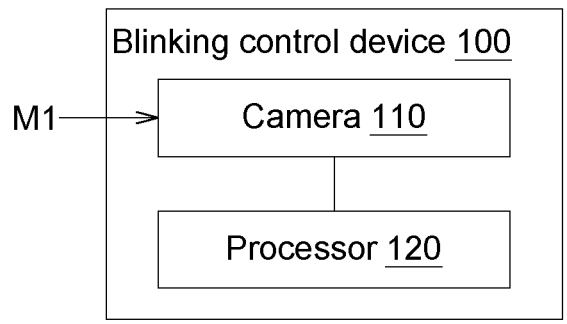
FIG. 1 shows a schematic diagram of a blinking control device according to an embodiment of the invention.
Figure 2:
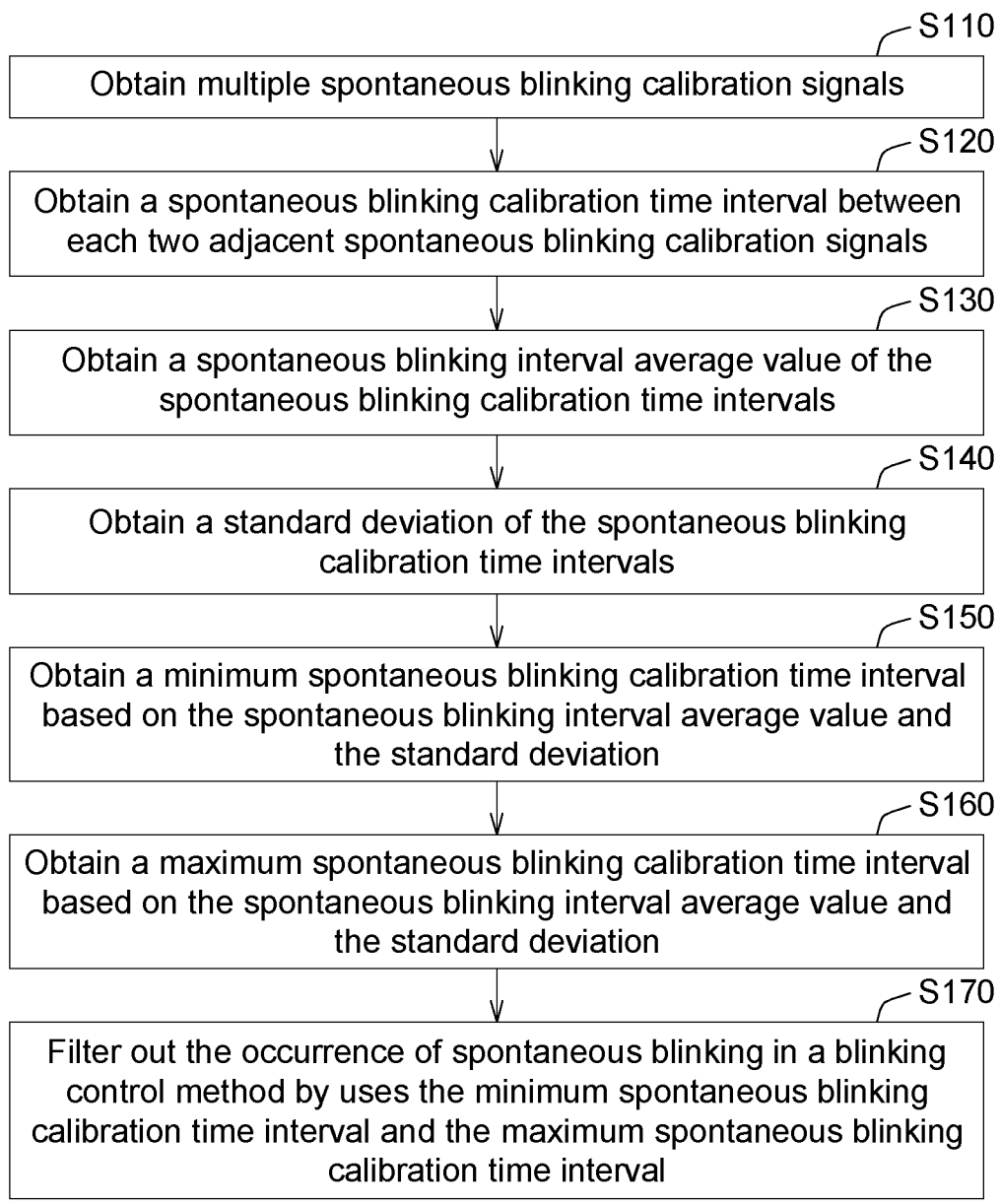
FIG. 2 shows a flow chart of a spontaneous blinking control method of the blinking control device of FIG. 1.
Figure 3:
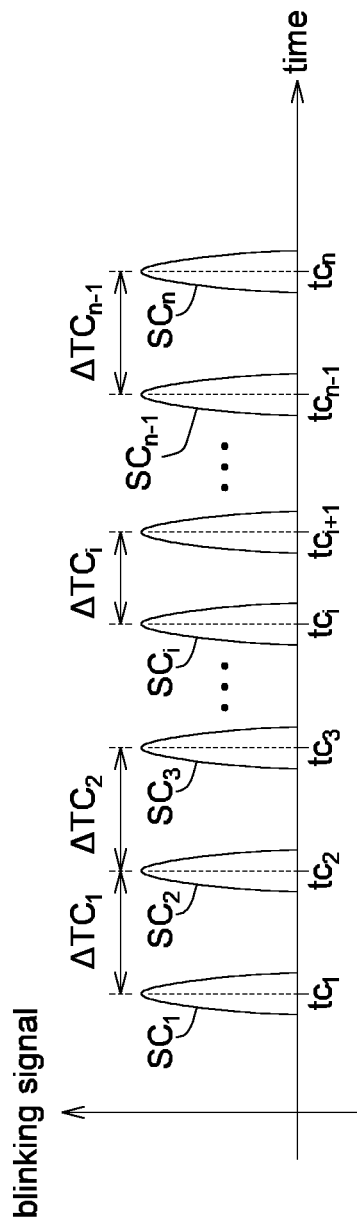
FIG. 3 shows a schematic diagram of multiple spontaneous blinking calibration signals according to an embodiment of the invention.
Figure 4:
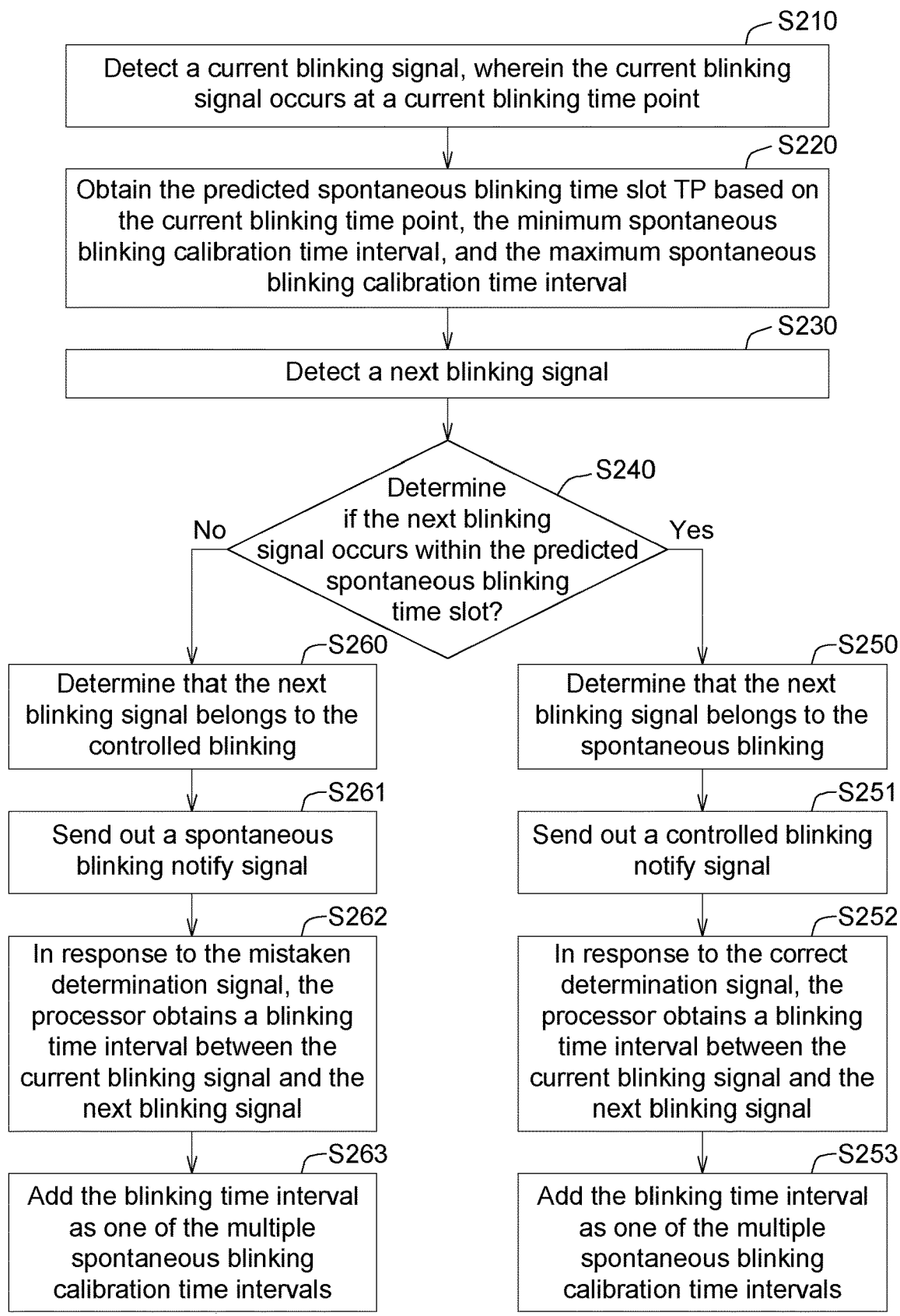
FIG. 4 shows a flow chart of a blinking control method of the blinking control device of FIG. 1.

Referring to FIGS. 1-3, FIG. 1 shows a schematic diagram of a blinking control device 100 according to an embodiment of the invention, FIG. 2 shows a flow chart of a spontaneous blinking control method of the blinking control device 100 of FIG. 1, and FIG. 3 shows a schematic diagram of multiple spontaneous blinking calibration signals $SC_i$ according to an embodiment of the invention.

The blinking control device 100 for example is a wearable device, such as a Virtual Reality (VR) device, Augmented Reality (AR) device, or other device that needs to be controlled by using blinking. The blinking control device 100 may analyze the user's spontaneous blinking mode, and during the process of the actual blinking control, the blinking control device 100 determines if the blinking of the user belongs to the spontaneous blinking or controlled blinking according to the spontaneous blinking mode, to filter the spontaneous blinking and accurately execute the corresponding function of the user's controlled blinking.

The blinking control device 100 comprises a camera 110 and a processor 120. The camera may capture the eye dynamic image M1 of the user. The processor 120 may process the eye dynamic image M1 of the user to obtain the spontaneous blinking mode of the user's eyes. The following is the flow chart of FIG. 2 and the blinking signal chart of FIG. 3 introducing the spontaneous blinking control method according to the embodiment of the invention.

In step S110, as shown in FIG. 1, the camera 110 obtains the eye dynamic image M1 of the user. The processor 120 analyzes the eye dynamic image M1 to obtain multiple spontaneous blinking calibration signals $SC_i$ as shown in FIG. 3, wherein the range of i is from 1 to n, wherein n is the total amount of the spontaneous blinking calibration signal, and it may be a positive integer which is equal to or greater than 1. As time goes by and the sampling increases, n may be accumulated. As shown in FIG. 3, the spontaneous blinking calibration time intervals $\Delta TC_i$ of the spontaneous blinking calibration signals $SC_i$ represents the time of blinking one time, and "blinking one time" herein refers to the process in which the eyelid begins to cover the eyeball to upwardly expose the eyeball. As shown in FIG. 3, the time point $tc_i$ corresponds to the peak value of each spontaneous blinking calibration signals $SC_i$, and represents the time point when the eyelid completely covers the eyeball. The processor 120 may analyze the up and down actions of the eyelid in the eye dynamic image M1, to generate multiple spontaneous blinking calibration signals $SC_i$ as shown in FIG. 3.

In step S120, the processor 120 calculates the spontaneous blinking calibration signals $SC_i$ to obtain the spontaneous blinking calibration time intervals $\Delta TC_i$ between each two adjacent ones of the spontaneous blinking calibration signals $SC_i$.

In step S130, the processor 120 may use the following equation (1) to obtain a spontaneous blinking interval average value $\Delta TC_{AVE}$ of the spontaneous blinking calibration time intervals $\Delta TC_i$.

$$\Delta TC_{AVE} = \frac{\sum_{i=1}^{i=(n-1)} \Delta TC_i}{n-1} \quad (1)$$

In step S140, the processor 120 uses standard deviation statistic method to obtain the standard deviation $\sigma$ of the spontaneous blinking calibration time intervals $\Delta TC_i$.

Figure 5A:
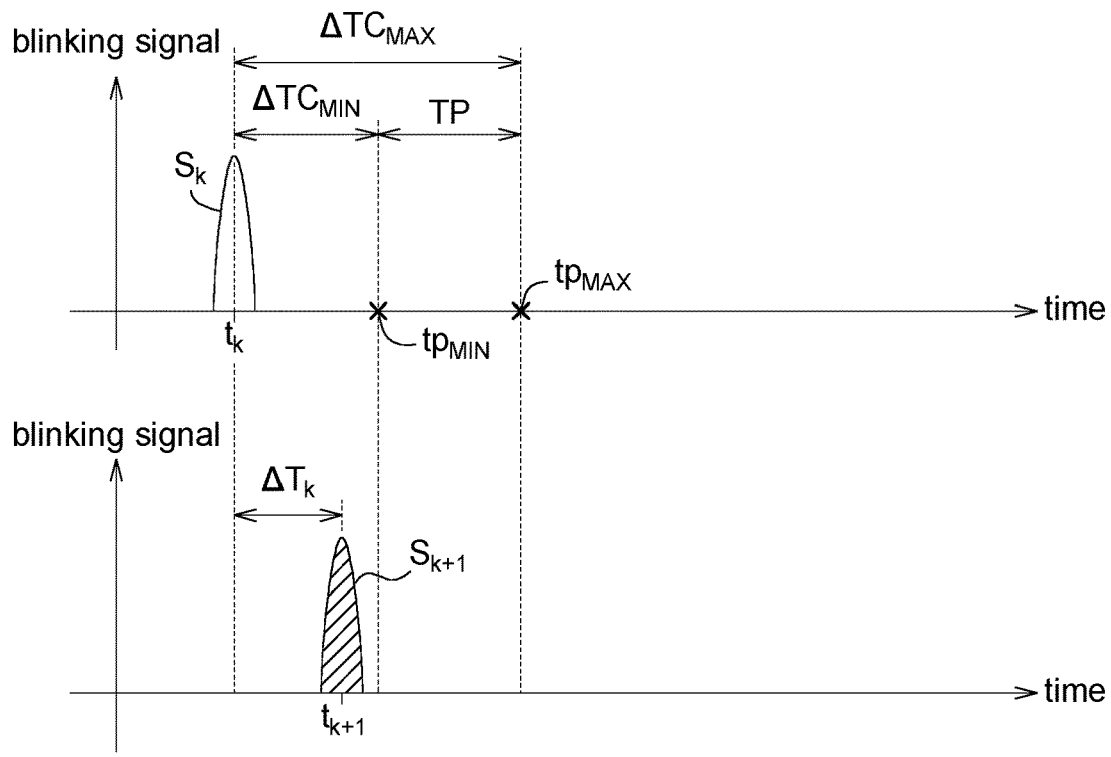
FIGS. 5A-5C shows a schematic diagram of blinking determination according to multiple embodiments of the invention.

In step S150, the processor obtains a minimum spontaneous blinking calibration time interval $\Delta TC_{MIN}$ based on the spontaneous blinking interval average value $\Delta TC_{AVE}$ and the standard deviation $\sigma$. For example, the processor 120 may obtain the minimum spontaneous blinking calibration time interval $\Delta TC_{MIN}$ according to the following equation (2), wherein parameter m represents a positive integer greater than 0. The value of parameter m is adjustable, which can be determined based on the required strictness. For example, when the parameter m is smaller, then the predicted spontaneous blinking time slot TP in FIG. 5A is narrower, and it is stricter in determining that the blinking belongs to the spontaneous blinking. On the contrary, when the parameter m is bigger, then the predicted spontaneous blinking time slot TP in FIG. 5A is wider, and it is looser in determining that the blinking belongs to the spontaneous blinking.

$$\Delta TC_{MIN} = \Delta TC_{AVE} - m \times \sigma \quad (2)$$

In step S160, the processor 120 obtain a maximum spontaneous blinking calibration time interval $\Delta TC_{MAX}$ based on the spontaneous blinking interval average value $\Delta TC_{AVE}$ and the standard deviation $\sigma$. For example, the processor 120 may obtain the maximum spontaneous blinking calibration time interval $\Delta TC_{MAX}$ according to the following equation (3).

$$\Delta TC_{MAX} = \Delta TC_{AVE} + m \times \sigma \quad (3)$$

In step S170, the processor 120 filters the occurrence of the spontaneous blinking in a blinking control method by using the minimum spontaneous blinking calibration time interval $\Delta TC_{MIN}$ and the maximum spontaneous blinking calibration time interval $\Delta TC_{MAX}$. The blinking control method of the blinking control device 100 according to an embodiment of the present invention is further illustrated below.

Figure 5B:
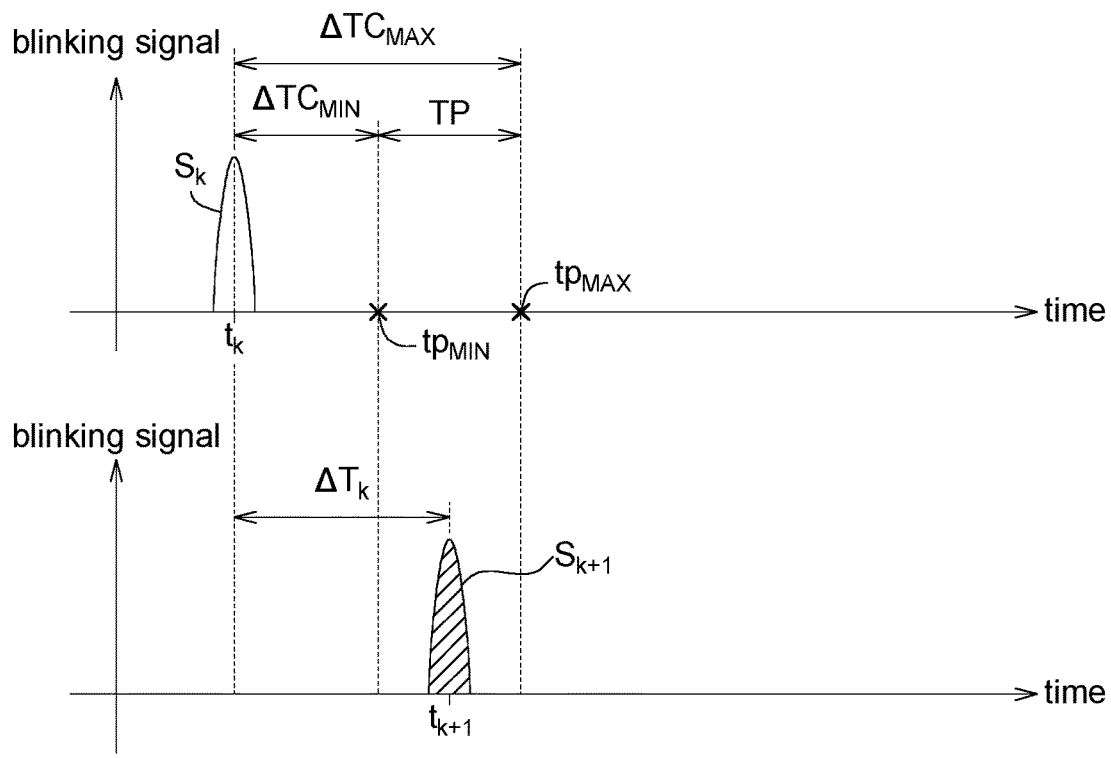
Figure 5C:
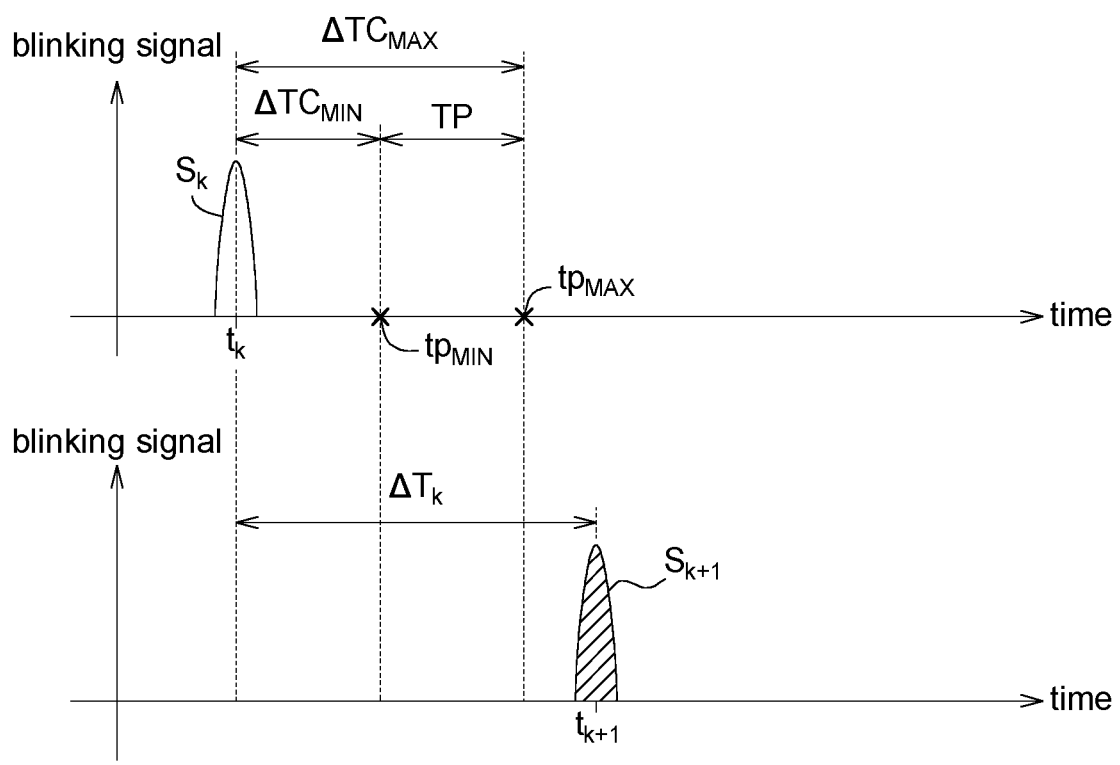
Figure 6:
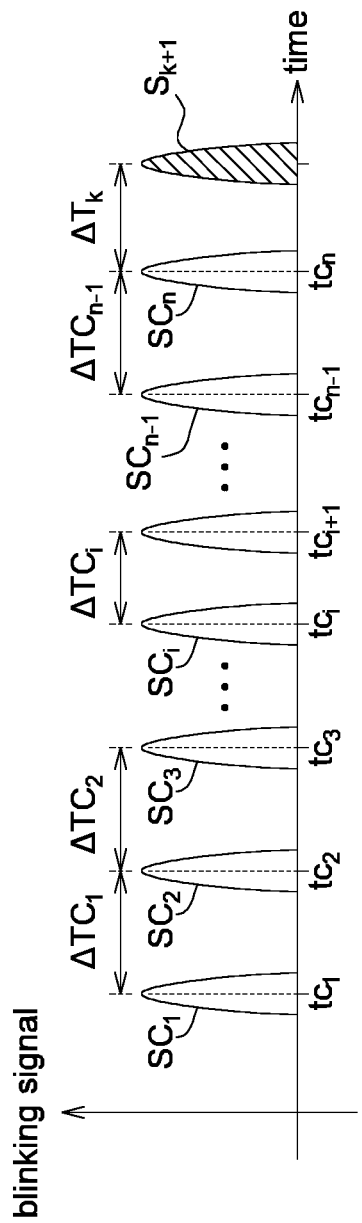
FIG. 6 shows a schematic diagram of adding next blinking signal as one of the multiple spontaneous blinking calibration time intervals.

Referring to FIGS. 4, 5A-5C and 5, FIG. 4 shows a flow chart of a blinking control method of the blinking control device 100 of FIG. 1, FIGS. 5A-5C shows a schematic diagram of blinking determination according to multiple embodiments of the invention, and FIG. 6 shows a schematic diagram of adding next blinking signal as one of the multiple spontaneous blinking calibration time intervals.

In step S210, the camera 110 obtains the eye dynamic image M1 of the user. The processor 120 processes the eye dynamic image M1 to detect a current blinking signal $S_K$, wherein the current blinking signal $S_K$ occurs at a current blinking time point $t_K$. The subscript k of the current blinking signal $S_K$ represents the time point of the current blinking time point, and the subscript k is represented by a positive integer. For example, the first current blinking signal of the blinking control method occurs at the time point which k equals to 1. The upper limit of k is not limited in the present invention, and as time goes by and the blinking signal sampling increases, k may be accumulated.

In step S220, the predicted spontaneous blinking time slot TP is obtained based on the current blinking time point $t_K$, the minimum spontaneous blinking calibration time interval $\Delta TC_{MIN}$, and the maximum spontaneous blinking calibration time interval $\Delta TC_{MAX}$. As shown in FIG. 5A, the predicted spontaneous blinking time slot TP occurs between the minimum predicted spontaneous blinking time point $tp_{MIN}$ and the maximum predicted spontaneous blinking time point $tp_{MAX}$. The minimum predicted spontaneous blinking time point $tp_{MIN}$ can be obtained according to the following equation (4), and the maximum predicted spontaneous blinking time point $tp_{MAX}$ can be obtained according to the following equation (5).

$$tp_{MIN} = t_K + \Delta TC_{MIN} \quad (4)$$

$$tp_{MAX} = t_K + \Delta TC_{MAX} \quad (5)$$

In step S230, as shown in FIG. 5A, as the camera 110 continuously captures the eye dynamic image M1 of the user, the processor can analyze the eye dynamic image M1 to obtain the next blinking signal $S_{K+1}$. The next blinking signal $S_{K+1}$ occurs at the time point $t_{K+1}$.

In step S240, the processor determines if the next blinking signal $S_{K+1}$ occurs within the predicted spontaneous blinking time slot TP. When the next blinking signal $S_{K+1}$ occurs within the predicted spontaneous blinking time slot TP (as shown in FIG. 5B), the flow enters step S250, and the processor 120 determines that the next blinking signal $S_{K+1}$ belongs to the spontaneous blinking.

In step S251, when the processor 120 determines that the next blinking signal $S_{K+1}$ belongs to the spontaneous blinking, the processor 120 may control a notify unit (not shown) to send out a spontaneous blinking notify signal to let the user confirm if the determination result is correct. The notify unit for example is a monitor, and the spontaneous blinking notify signal for example is an image, such as words or images, which represents that the next blinking signal $S_{K+1}$ determined by the blinking control device 100 is a spontaneous blinking. Or, the notify unit for example is a voice generator, and the spontaneous blinking notify signal for example is a voice which represents that the next blinking signal $S_{K+1}$ determined by the blinking control device 100 is a spontaneous blinking.

In response to the spontaneous blinking notify signal, the user may inform the blinking control device 100 if the user is positive or negative about the determination result. For example, when the user considers that the next blinking signal $S_{K+1}$ indeed belongs to the spontaneous blinking, the user may send out a correct determination signal to inform the blinking control device 100 that the determination result is correct.

Or, when the user considers that the next blinking signal $S_{K+1}$ actually belongs to the controlled blinking, the user may sent out a mistaken determination signal to inform the blinking control device 100 that the determination result is mistaken. Afterwards, the processor 120 may set the spontaneous blinking which is misdetermined as a user control mode. For example, in response to the mistaken determination signal, the processor 120 may use a voice or an image to prompt the user to input a user control method, and the processor 120 set the spontaneous blinking as the user control method. In this way, when the spontaneous blinking occurs subsequently, the processor 120 regards it as the user executing the user control method, and the processor 120 correspondingly executes the corresponding function. The above user control method for example is a mouse clicking method (such as clicking the left button or the right button of the mouse), a joystick control method, a keyboard inputting control method, a touching method of a touch pad, or other suitable methods.

In an embodiment, the way the user responds to the spontaneous blinking notify signal may be a voice or an action. For example, the blinking control device 100 may further comprises a microphone (not shown), and the user sends out a voice through the microphone. For example, when the user considers that the next blinking signal $S_{K+1}$ indeed belongs to the spontaneous blinking, the user may send out a voice which represents that the determination is correct by the microphone. The processor 120 analyzes the voice, and is informed that the determination result is correct. When the user considers that the next blinking signal $S_{K+1}$ actually belongs to the controlled blinking, the user may send out a voice which represents that the determination is mistaken. The processor 120 analyzes the voice, and is informed that the determination result is mistaken.

Or, the blinking control device 100 may further comprises an acceleration sensor (G sensor) (not shown). The blinking control device 100 may detect the head action of the user, and the processor 120 analyzes the action of the user according to the signal of the acceleration sensor. For example, when the next blinking signal $S_{K+1}$ belongs to the spontaneous blinking, the user may make an action which represents that the determination is correct, such as nodding, and the processor 120 analyzes the signal of the acceleration sensor accordingly, and is informed that the determination result is correct. When the next blinking signal $S_{K+1}$ actually belongs to the controlled blinking, the user may make an action which represents that the determination is mistaken, such as shaking head, and the processor 120 analyzes the signal of the acceleration sensor accordingly, and is informed that the determination result is mistaken.

In step S252, when the next blinking signal $S_{K+1}$ indeed belongs to the spontaneous blinking, the user sends out the correct determination signal through the above method, and informs the blinking control device 100 that the determination is correct. Afterwards, as shown in FIG. 5B, in response to the correct determination signal, the processor 120 obtains a blinking time interval $\Delta T_K$ between the current blinking signal $S_K$ and the next blinking signal $S_{K+1}$.

In step S253, as shown in FIG. 6, the processor 120 adds the next blinking signal $S_{K+1}$ and it's blinking time interval $\Delta T_K$ as one of the multiple spontaneous blinking signals $SC_i$ and the multiple spontaneous blinking calibration time intervals $\Delta TC_i$ in FIG. 3 according to the correct determination signal sent out by the user. As shown, the next blinking signal $S_{K+1}$ is immediately after the last spontaneous blinking signal $SC_n$ of the original multiple spontaneous blinking signals $SC_i$. That is, the starting time point of the blinking time interval $\Delta T_K$ is the time point $tc_n$ of the last spontaneous blinking signal $SC_n$. Afterwards, as shown in FIG. 6, for all of the multiple spontaneous blinking signals $SC_i$ (comprising the next blinking signal $S_{K+1}$) and multiple spontaneous blinking calibration time intervals $\Delta TC_i$ (comprising the blinking time interval $\Delta T_K$) in FIG. 6, the processor 120 re-executes the steps S110-S160 in FIG. 2 to obtain the updated spontaneous blinking calibration time interval $\Delta TC_j$, the updated spontaneous blinking interval average value $\Delta TC_{AVE}$, the updated standard deviation $\sigma$, the updated minimum spontaneous blinking calibration time interval $\Delta TC_{MIN}$, and the updated maximum spontaneous blinking calibration time interval $\Delta TC_{MAX}$. Afterwards, the minimum spontaneous blinking calibration time interval $\Delta TC_{MIN}$ is replaced by the updated minimum spontaneous blinking calibration time interval, and the maximum spontaneous blinking calibration time interval $\Delta TC_{MAX}$ is replaced by the updated maximum spontaneous blinking calibration time interval, as a latest determination basis determining if the next (or recent) blinking signal belongs to the spontaneous blinking or the controlled blinking in the blinking control flow (for example, FIG. 4).

In step S240, the processor determines if the next blinking signal $S_{K+1}$ occurs within the predicted spontaneous blinking time slot TP. When the next blinking signal $S_{K+1}$ does not occur within the predicted spontaneous blinking time slot TP, for example, the next blinking signal $S_{K+1}$ occurs outside the predicted spontaneous blinking time slot TP (as shown in FIG. 5A or FIG. 5C), the flow enters step S260, and the processor determines that the next blinking signal $S_{K+1}$ belongs to the controlled blinking.

In step S261, when the processor 120 determines that the next blinking signal $S_{K+1}$ belongs to the controlled blinking, the processor 120 may control the said notify unit (not shown) to send out a controlled blinking notify signal to let the user confirm if the determination result is correct.

The user may use a method similar to or same as the above method for responding the spontaneous blinking notify signal. In response to the controlled blinking notify signal, the user may inform the blinking control device 100 if the user is positive or negative about the determination result. For example, when the next blinking signal $S_{K+1}$ indeed belongs to the controlled blinking, the user may send out a correct determination signal to inform the blinking control device 100 that the determination result is correct. Afterwards, in response to the determination correct signal, the processor 120 executes the function correspond to the controlled blinking.

Or, when the next blinking signal $S_{K+1}$ actually belongs to the spontaneous blinking, the user may use a method similar to or same as the above method for responding the spontaneous blinking notify signal, send out the determination mistaken signal, and inform the blinking control device 100 that the determination result is mistaken.

In step S262, when the next blinking signal $S_{K+1}$ actually belongs to the spontaneous blinking, the user sends out the mistaken determination signal through the above method, and informs the blinking control device 100 that the determination is mistaken. Afterwards, as shown in FIG. 5A or FIG. 5C, in response to the mistaken determination signal, the processor 120 obtains a blinking time interval $\Delta T_K$ between the current blinking signal $S_K$ and the next blinking signal $S_{K+1}$.

Afterwards, in step S263, as shown in FIG. 6, the processor 120 adds the next blinking signal $S_{K+1}$ and it's blinking time interval $\Delta T_K$ as one of the multiple spontaneous blinking signals $SC_i$ and the multiple spontaneous blinking calibration time intervals $\Delta TC_i$ in FIG. 3 according to the mistaken determination signal sent out by the user. Afterwards, as shown in FIG. 6, for all of the multiple spontaneous blinking signals $SC_i$ (comprising the next blinking signal $S_{K+1}$) and multiple spontaneous blinking calibration time intervals $\Delta TC_i$ (comprising the blinking time interval $\Delta T_K$) in FIG. 6, the processor 120 re-executes the steps S110-S160 in FIG. 2 to obtain the updated spontaneous blinking calibration time interval $\Delta TC_j$, the updated spontaneous blinking interval average value $\Delta TC_{AVE}$, the updated standard deviation σ, the updated minimum spontaneous blinking calibration time interval $\Delta TC_{MIN}$, and the updated maximum spontaneous blinking calibration time interval $\Delta TC_{MAX}$. Afterwards, the minimum spontaneous blinking calibration time interval $\Delta TC_{MIN}$ is replaced by the updated minimum spontaneous blinking calibration time interval, and the maximum spontaneous blinking calibration time interval $\Delta TC_{MAX}$ is replaced by the updated maximum spontaneous blinking calibration time interval, as a latest determination basis determining if the next (or recent) blinking signal belongs to the spontaneous blinking or the controlled blinking in the blinking control flow (for example, FIG. 4).

In summary, an embodiment of the blinking control device of present invention may obtain a user spontaneous blinking mode. In another embodiment, in the actual blinking control method, the blinking control device determines if each blinking of the user belongs to the spontaneous blinking mode or the controlled blinking mode based on the spontaneous blinking mode.

In another embodiment, when the blinking control device determines that the blinking of the user belongs to the spontaneous blinking and the user actually responds that the determination result is correct, the blinking control device adds the spontaneous blinking into the known spontaneous blinking mode and re-calculates, and obtains the updated spontaneous blinking mode. When the blinking control device determines that the blinking of the user belongs to the controlled blinking and the user actually responds that the determination result is mistaken (represents that the blinking of the user actually belongs to the spontaneous blinking), the blinking control device adds the controlled blinking into the known spontaneous blinking mode and re-calculates, and obtains the updated spontaneous blinking mode. In this way, in the actual blinking control method, the blinking control method can continuously correct the spontaneous blinking mode based on the actual situation, and the blinking control device can be more accurate in determining the controlled blinking of the user.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A spontaneous blinking calibration method, comprising:
    obtaining a plurality of spontaneous blinking calibration signals from a plurality of spontaneous blinkings;
    obtaining a spontaneous blinking calibration time interval between each two adjacent ones of the plurality of spontaneous blinking calibration signals;
    obtaining a spontaneous blinking interval average value of the spontaneous blinking calibration time intervals;
    obtaining a standard deviation of the spontaneous blinking calibration time intervals;
    obtaining a minimum spontaneous blinking calibration time interval according to the spontaneous blinking interval average value and the standard deviation;
    obtaining a maximum spontaneous blinking calibration time interval according to the spontaneous blinking interval average value and the standard deviation; and
    using the minimum spontaneous blinking calibration time interval and the maximum spontaneous blinking calibration time interval in a blinking control method to filter an occurrence of a spontaneous blinking.

2. The spontaneous blinking calibration method of claim 1, wherein in the step of obtaining the minimum spontaneous blinking calibration time interval according to the spontaneous blinking interval average value and the standard deviation further comprises:
    obtaining the minimum spontaneous blinking calibration time interval $\Delta TC_{MIN}$ according to the equation $\Delta TC_{MIN} = \Delta TC_{AVE} - m \times \sigma$, wherein $\Delta TC_{AVE}$ represents the spontaneous blinking interval average value, σ represents the standard deviation, and m represents a positive integer greater than 0.

3. The spontaneous blinking calibration method of claim 1, wherein in the step of obtaining the maximum spontaneous blinking calibration time Interval according to the spontaneous blinking interval average value and the standard deviation further comprises:
    obtaining the maximum spontaneous blinking calibration time interval $\Delta TC_{MAX}$ according to the equation $\Delta TC_{MAX} = \Delta TC_{AVE} + m \times \sigma$, wherein $\Delta TC_{AVE}$ represents the spontaneous blinking interval average value, σ represents the standard deviation, and m represents a positive integer greater than 0.

4. The spontaneous blinking calibration method of claim 1, wherein the blinking control method comprises:
    detecting a current blinking signal, wherein the current blinking signal occurs at a current blinking time point;
    obtaining a predicted spontaneous blinking time slot according to the current blinking time point, the minimum spontaneous blinking calibration time interval, and the maximum spontaneous blinking calibration time interval;
    detecting a next blinking signal;
    determining if the next blinking signal occurs within the predicted spontaneous blinking time slot;
    determining if the next blinking signal belongs to the spontaneous blinking when the next blinking signal occurs within the predicted spontaneous blinking time slot; and
    determining if the next blinking signal belongs to a controlled blinking when the next blinking signal occurs outside the predicted spontaneous blinking time slot.

5. A blinking control method, comprising:
    detecting a current blinking signal, wherein the current blinking signal occurs at a current blinking time point;
    obtaining a predicted spontaneous blinking time slot according to the current blinking time point, a minimum spontaneous blinking calibration time interval $\Delta TC_{MIN}$, and a maximum spontaneous blinking calibration time interval $\Delta TC_{MAX}$;

detecting a next blinking signal;

determining if the next blinking signal occurs within the predicted spontaneous blinking time slot;

determining if the next blinking signal belongs to a spontaneous blinking when the next blinking signal occurs within the predicted spontaneous blinking time slot; and determining if the next blinking signal belongs to a controlled blinking when the next blinking signal occurs outside the predicted spontaneous blinking time slot.

6. The blinking control method of claim 5, wherein in the step of obtaining the predicted spontaneous blinking time slot, the predicted spontaneous blinking time slot occurs between a minimum predicted spontaneous blinking time point $tp_{MIN}$ and a maximum predicted spontaneous blinking time point $tp_{MAX}$, the minimum predicted spontaneous blinking time point $tp_{MIN}$ is obtained according to the equation $tp_{MIN}=t_K+\Delta TC_{MIN}$, and the maximum predicted spontaneous blinking time point $tp_{MAX}$ is obtained according to the equation $tp_{MAX}=t_K+\Delta TC_{MAX}$, wherein $t_K$ is the current blinking time point.

7. The blinking control method of claim 5, wherein the blinking control method further comprises:

sending out a controlled blinking notify signal when the next blinking signal is the controlled blinking.

8. The blinking control method of claim 7, wherein the blinking control method further comprises:

sending a mistaken determination signal in response to the controlled blinking notify signal.

9. The blinking control method of claim 8, wherein the blinking control method further comprises:

obtaining a blinking time interval between the current blinking signal and the next blinking signal in response to the mistaken determination signal;

adding the blinking time interval as one of a plurality of spontaneous blinking calibration time intervals;

obtaining a spontaneous blinking calibration time interval between each two adjacent ones of the spontaneous blinking calibration signals;

obtaining a spontaneous blinking interval average value of the spontaneous blinking calibration time intervals;

obtaining a standard deviation of the spontaneous blinking calibration time intervals;

obtaining an updated minimum spontaneous blinking calibration time interval according to the spontaneous blinking interval average value and the standard deviation;

obtaining an updated maximum spontaneous blinking calibration time interval according to the spontaneous blinking interval average value and the standard deviation; and replacing the minimum spontaneous blinking calibration time interval with the updated minimum spontaneous blinking calibration time interval, and replacing the maximum spontaneous blinking calibration time interval with the updated maximum spontaneous blinking calibration time interval.

10. The blinking control method of claim 5, wherein the blinking control method further comprises:

sending a spontaneous blinking notify signal when the next blinking signal is the spontaneous blinking.

11. The blinking control method of claim 10, wherein the blinking control method further comprises:

sending out a mistaken determination signal in response to the spontaneous blinking notify signal; and setting the spontaneous blinking which is misdetermined as a user control method in response to the mistaken determination signal.

* * * * *